United States Patent [19]

Kondo

[11] Patent Number: 4,777,530
[45] Date of Patent: Oct. 11, 1988

[54] APPARATUS FOR DETECTING A MOTION OF A PICTURE OF A TELEVISION SIGNAL

[75] Inventor: Tetsujiro Kondo, Kanagawa, Japan

[73] Assignee: Sony Corporation, Tokyo, Japan

[21] Appl. No.: 795,926

[22] Filed: Nov. 7, 1985

[30] Foreign Application Priority Data

Nov. 7, 1984 [JP] Japan .................. 59-234778

[51] Int. Cl.[4] .............................. H04N 5/14
[52] U.S. Cl. .................... 358/160; 358/105
[58] Field of Search ............. 358/105, 108, 136, 135, 358/160, 166, 167

[56] References Cited

U.S. PATENT DOCUMENTS

| | | | |
|---|---|---|---|
| 3,634,008 | 1/1972 | Plummer et al. | 355/56 |
| 4,240,101 | 12/1980 | Michael et al. | 358/11 |
| 4,240,106 | 12/1980 | Michael et al. | 358/36 |
| 4,240,109 | 12/1980 | Michael et al. | 358/105 |
| 4,307,420 | 12/1981 | Ninomiya et al. | 358/136 |
| 4,458,266 | 7/1984 | Mahoney | 358/105 |
| 4,546,386 | 10/1985 | Matsumoto et al. | 358/136 |
| 4,575,756 | 3/1986 | Furukawa | 358/136 |

FOREIGN PATENT DOCUMENTS 2116397A 9/1983 United Kingdom .

Primary Examiner—James J. Groody
Assistant Examiner—David E. Harvey
Attorney, Agent, or Firm—Lewis H. Eslinger; Jay H. Maioli

[57] ABSTRACT

Apparatus for detecting movement of a television picture using a movement vector integrates an absolute value of a frame difference between a current frame and a previous frame for every one of a plurality of regions which are formed by dividing a picture of one field and by detecting movement vectors using frame difference integration data for every said plurality of regions.

A residual deviation which is caused when performing a correction of an overall movement of said one field from each of said plurality of movement vectors is calculated and the movement vector, whereby the residual deviation of each of be plurality of movement vectors becomes a minimum is selected.

9 Claims, 3 Drawing Sheets

APPARATUS FOR DETECTING A MOTION OF A PICTURE OF A TELEVISION SIGNAL

BACKGROUND OF THE INVENTION

The present invention relates to an apparatus for detecting a motion of a television image which is applied to detect a movement vector indicative of an amount of movement and a moving direction of a television camera when the overall pick-up picture moves due to panning or the like of a television camera.

As one of the methods of narrowing the transmission band of a high quality television signal, there is a method whereby a movement vector indicative of the movement of a television camera is transmitted together with the image data whose data amount was reduced to ¼ so as to shift the subsampling location at a four-field period, and on the reception side, a picture plane of one field is reproduced using the data during the period of four fields with respect to a still image, and in the case where the whole picture moves in the same direction as in the case where the television camera pans, the coordinate axis is shifted in accordance with the movement vector and thereby reading out the data in the previous frame from a memory, and thereby performing the movement correction.

For the movement vector which is used for such a movement correction, it is enough that one movment vector is provided for one field. Hitherto, to improve an estimation accuracy a picture plane is divided into four regions and a plurality of movement vectors obtained in each region are subjected to a process of a majority decision or a simple arithmetic averaging process, thereby deriving the movement vectors regarding the whole picture plane.

To obtain the movement vector in each region which is derived by dividing one picture plane into a plurality of regions, a block matching method is used. Further, a simplification by way of representation points is made and the picture plane is divided into a plurality of blocks, then a frame difference for detection of movement vectors is derived on each block unit basis, thereby examining a degree of correlation from the absolute value of this frame difference. The frame difference is the difference between the pixel (representative point) at the spatial center of a target block of the previous frame, for instance, and each pixel included in a target block of the current frame. By integrating the absolute value of this frame difference for every four regions of one picture plane, a table of frame difference integration data of each region is obtained. The location of the minimum value in this frame difference integration table is detected as a movement vector of that region.

Conventional apparatus for detecting a movement vector of a television camera have the following drawbacks as mentioned hereinafter.

First, reliabilities of the movement vectors derived from the frame difference integration table of each region differ in dependence on the picture in that region. For instance, in the region having a large amount of low frequency components, such as a sky or a sea, the distribution near the minimum value has a gradual slope in the frame difference integration table and a reliability of movement vector is low. On the contrary, in the region having a large amount of high frequency componets, such as a fine picture, the distribution is steep and a reliability of movement vector is high. Conventional apparatus do not consider such a difference in reliability due to the content of respective pictures.

Second, since the degree of influence of noise, moving objects or the like in respective regions will differ, the detection accuracies of movement vectors in respective regions will also differ. Practically speaking, in the region where there is little noise and few moving objects, the frame differences regarding almost all of the pixels become minimum at the position of the movement vectors, so that the distribution having a single extreme value is obtained. On the contrary, in the region where there are large noises and many moving objects, the distribution of the frame differences has a plurality of extreme values, so that the accuracy of the movement vectors detected in such a region is low. In conventional apparatus, such influences of noises, moving objects, etc. are not considered.

OBJECT AND SUMMARY OF THE INVENTION

It is an object of the present invention to eliminate the drawbacks of conventional apparatus for detecting a movement vector and to provide reliabilities of movement vectors derived in each region and to provide an apparatus for detecting a movement vector which can detect proper movement vectors as the movement vectors of the whole picture plane in consideration of those reliabilities.

Another object of the invention is to provide an apparatus for detecting a movement vector in which hardware scale is not so large and a proper movement vector can be detected by a simple process.

According to the present invention, the movement vector which minimizes the frame difference integration data regarding the overall picture plane is selected from among the movement vectors derived with regard to each of a plurality of regions which are formed by dividing a picture plane of one field, thereby making it possible to take out the movement vector which can be applied most preferably to the whole picture plane as a movement vector of one field.

According to the present invention, four movement vectors of the respective regions are not averaged but one of them is selected. Therefore, the minimum value of the frame difference integration data and the movement vector of the distribution in which the gradient of the frame difference integration data around this minimum value is steep can be selected as a movement vector of one field. In addition, the hardware scale can be made relatively small as compared with an arrangement such that a weight coefficient taking into account both the steepness of the distribution and the residual deviation is generated and a process for a weighted means is performed on the basis of this weight coefficient.

DETAILED DESCRIPTION OF PREFERRED EMBODIMENTS

Figure 5:
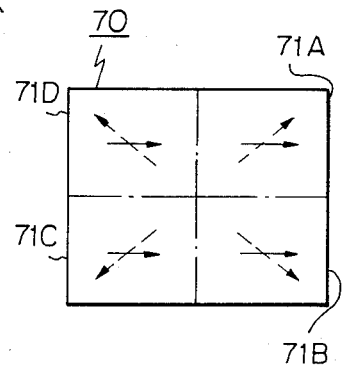

The movement vector is derived with respect to each of the regions 71A to 71D, as shown in FIG. 5 which are formed by, for instance, dividing a picture plane of one field into four regions. One of those four movement vectors is selected as a movement vector regarding the whole one field. The reference of this selection is determined in a manner such that when four movement vectors are respectively applied to the same region and to the other regions and the movement correction is performed, the residual deviation at this time becomes minimum. The selection reference decided in this way reflects not only the residual deviation but also a degree of steepness of the gradient of the distribution of the frame difference integration data. On one hand, in the case where the overall picture plane is represented by the selected movement vectors, the verification of its propriety based on an extent of coincidence is performed, thereby determining whether the selected movement vector is to be output or not.

Figure 1:
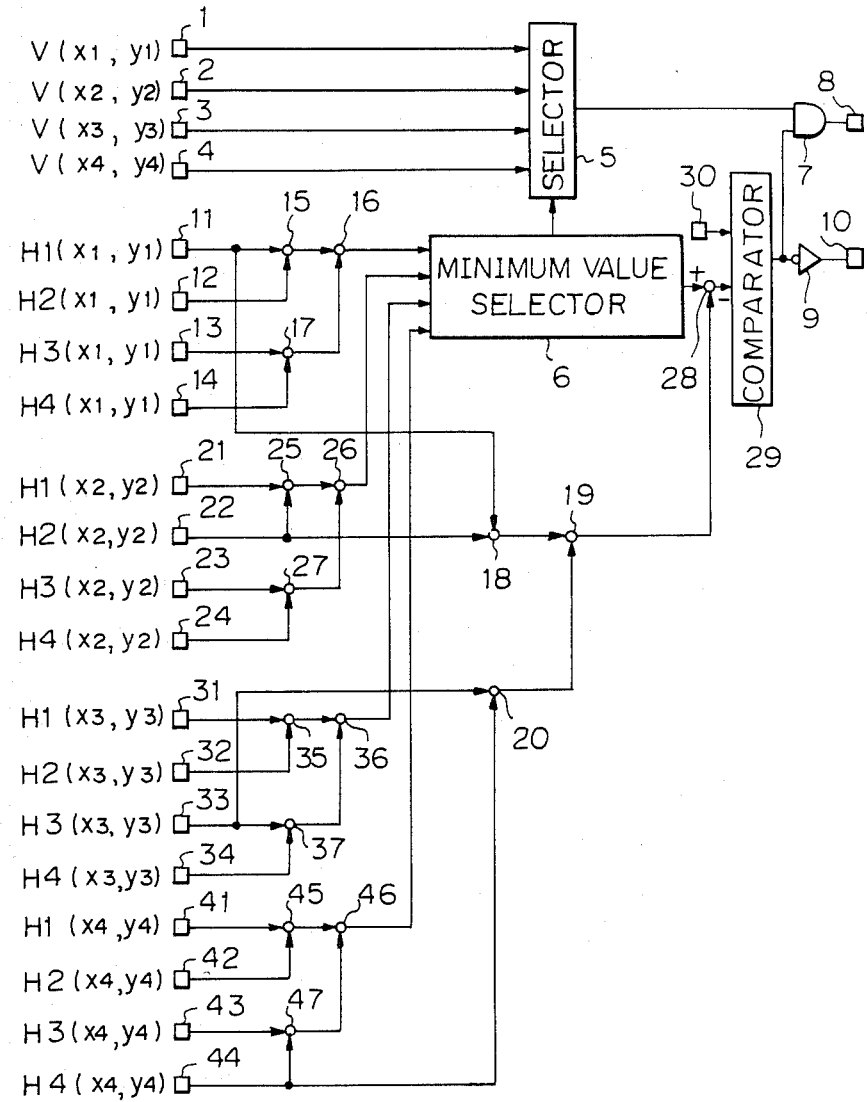
FIG. 1 is a block diagramof a selection reference generator and a selecting circuit in one embodiment of the present invention.

One embodiment of the present invention will now be described in detail hereinbelow with reference to the drawings. In this embodiment, the picture plane of one field is divided into four regions and the movement vector having the highest reliability is selected from among the movement vectors obtained for each region. In FIG. 1, movement vectors $V(x_1, y_1)$, $V(x_2, y_2)$, $V(x_3, y_3)$, and $V(x_4, y_4)$ obtained in each region are supplied to input terminals indicated at reference numerals 1, 2, 3, and 4, respectively.

Figure 3:
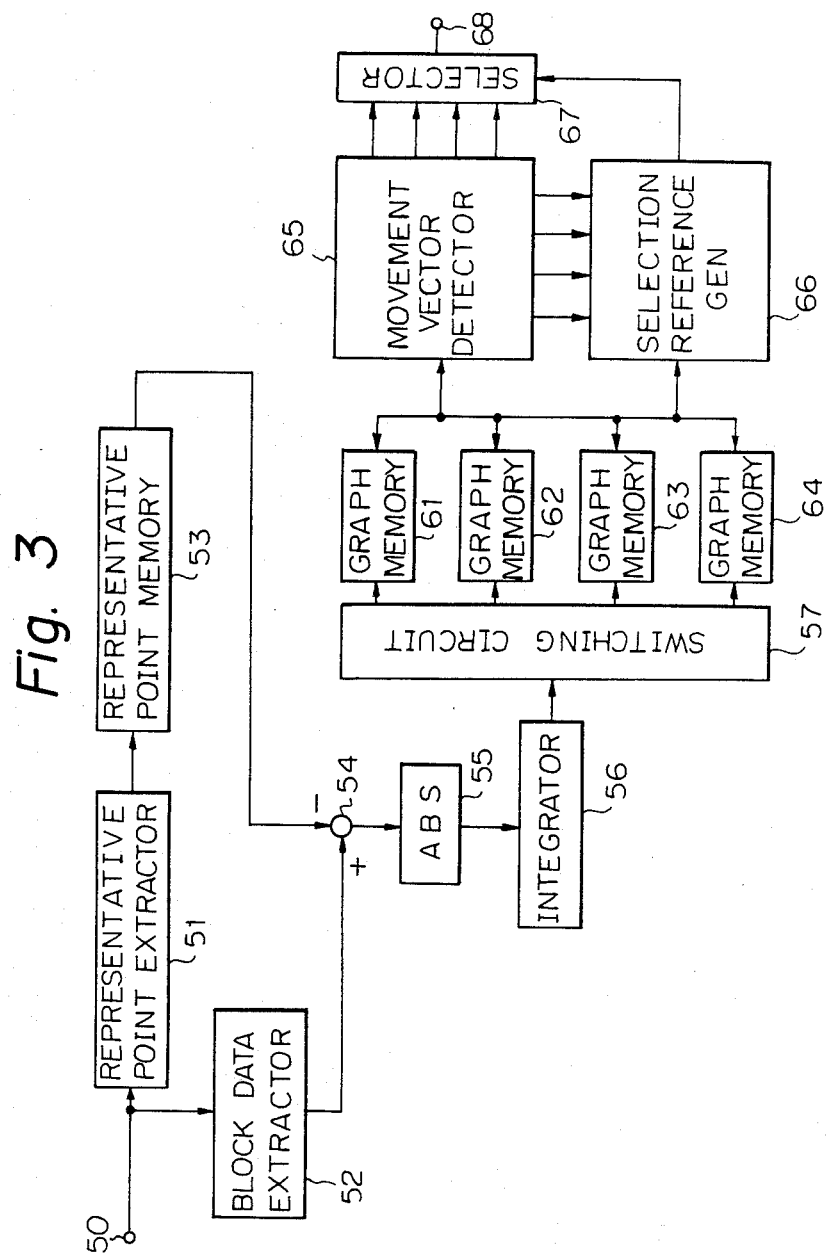
FIG. 3 is an overall block diagram of one embodiment of the invention.

The detection of those movement vectors will then be explained with reference to FIGS. 3, 4 and 5. In FIG. 3, reference numeral 50 denotes an input terminal of a digital television signal which was produced by a television camera and digitized. This digital television signal is supplied to a representative point extracting circuit 51 and a block data extracting circuit 52. Pixel data of the representative point obtained as an output of the extracting circuit 51 is supplied to a representative point memory 53. The pixel data of the representative point read out from the memory 53 is the data in the previous frame.

The block data extracting circuit 52 extracts the pixel data for every block included in the current frame and supplies it to a subtracter 54. A difference between the representative point in the current frame and the representative point in the previous frame with respect to each pixel in the block, namely, the frame difference data is obtained by the subtracter 54. This frame difference data is supplied to a converter 55 and is converted into an absolute value.

Figure 4:
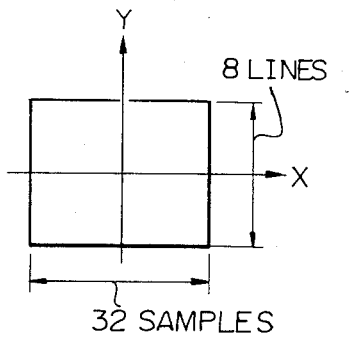
FIGS. 4 and 5 are schematic diagrams which are used to explain the detection of movement vectors.

As an example, as shown in FIG. 4, one block has a size such that there are thirty-two samples in the horizontal direction and eight lines in the vertical direction. Therefore, 256 pixels are contained in one block. The representative point is the pixel data which is located at the spatial center of one block.

The absolute value of the frame difference data from the converter 55 is supplied to an integrating circuit 56 that accumulates the frame difference data for each block. The integration value of the frame difference data is supplied to a switching circuit 57. As shown in FIG. 5, the frame difference data is obtained for each of the four regions 71A, 71B, 71C, and 71D formed by dividing a picture plane 70 of one field into four regions. The integration value of the frame difference data from the integrating circuit 56 is distributed to graph memories 61, 62, 63, and 64 for each respective region by the switching circuit 57. The graph memory 61 is a memory of a capacity of one block to store the integration value (frame difference integration data) of the absolute value of the frame difference data of each block included in the region 71A. Each of the graph memories 62, 63 and 64 likewise stores the frame difference integration data in each of the regions 71B, 71C and 71D.

The frame difference integration data stored respectively in the graph memories 61 to 64 are supplied to a movement vector generator circuit 65. The movement vector of each region is generated from the minimum value of the frame difference integration data. On one hand, this minimum value and the frame difference integration data in the graph memories 61 to 64 are supplied to a selection reference generator 66. A selection signal to select the movement vector having the highest reliability among the four movement vectors is generated from the generator 66. A selecting circuit 67 is controlled by this selection signal, so that the selected movement vector of one field is taken out from an output terminal 68.

Each of the graph memories 61 to 64 has two memory banks to process the digital television signal inputted in a real time manner. In the field where the frame difference integration data is written in one of those memory banks, the frame difference integration data is read out from the other memory bank and at the same time the movement vector is detected and selected.

In FIG. 5, as indicated by solid lines, in the case where the respective movement vectors in the regions 71A to 71D become identical, this case is ideal. However, actually, degrees of reliabilities of the movement vectors derived for every region differ in dependence on the pictures of an image (difference between the picture of a low frequency and the picture of a high frequency) or on the influence of moving objects. In addition, in FIG. 5, the movement vectors indicated by broken lines are the vectors when the television camera zooms up. In this case, four movement vectors are spread radially from the center.

The selection reference generator 66 and selecting circuit 67 in FIG. 3 have an arrangement shown in FIG. 1. The respective movement vectors of the regions 71A to 71D which are supplied to the input terminals 1 to 4 in FIG. 1 are formed by the movement vector detecting circuit 65. The coordinates $(x_1, y_1)$, $(x_2, y_2)$, $(x_3, y_3)$, and $(x_4, y_4)$ represent the positions of the minimum values in the distributions of the frame difference integration data in the graph memories 61 to 64, respectively.

In FIG. 1, frame difference integration data $H1(x_1, y_1)$, $H2(x_1, y_1)$, $H3(x_1, y_1)$, and $H4(x_1, y_1)$ are respectively supplied to input terminals indicated at 11, 12, 13, and 14. $H1(x_1, y_1)$ indicates the minimum value in the table of the frame difference integration data of the region 71A. This minimum value shows the value of the residual deviation after the movement correction using the movement vector $V1(x_1, y_1)$ of the region 71A. $H2(x_1, y_1)$, $H3(x_1, y_1)$ and $H4(x_1, y_1)$ denote the residual deviations after the movement correction, respectively, when the movement vector $V1(x_1, y_1)$ is applied to the regions 71B, 71C and 71D. As shown in FIG. 2, only the direction of the x axis as one dimension will be considered for simplicity.

Figure 2A:
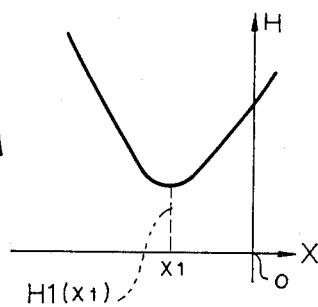
FIGS. 2A-2D are is a schematic diagram which is used to explain the selection reference generator.

By converting the digital data into analog data, the distribution regarding the X axis passing through the position of the minimum value of the frame difference integration data of the region 71A stored in the graph memory 61 can be expressed as shown in FIG. 2A. In FIG. 2, an axis of ordinate indicates the magnitude of the value of the frame difference integration data.

Figure 2B:
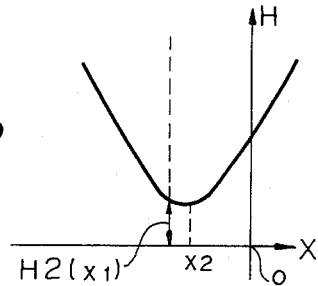
Figure 2C:
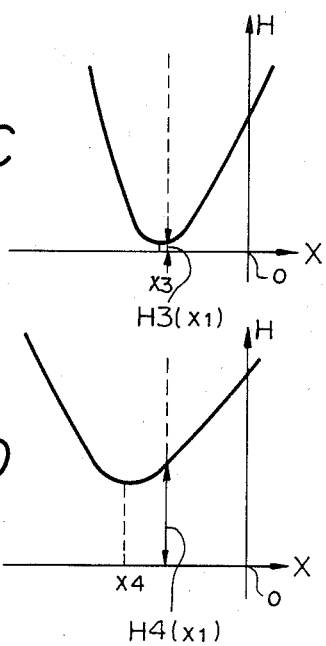
Figure 2D:
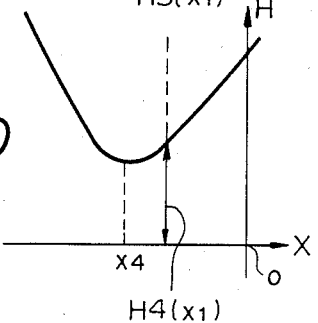

Similarly, the distribution regarding the X axis direction of the frame difference integration data of the region 71B is shown in FIG. 2B. The distribution with respect to the X axis direction of the frame difference integration data of the region 71C is shown in FIG. 2C. The distribution with regard to the X axis direction of the frame difference integration data of the region 71D is shown in FIG. 2D. The states of the distributions of the frame difference integration data shown in FIG. 2 as examples, namely, the positions of the minimum values, the gradients between the minimum values and the frame difference integration data therearound, and the values of the minimum values (residual deviations) slightly differ for every region.

In FIGS. 2B, 2C and 2D, the respective frame difference integration data $H2(x_1)$, $H3(x_1)$ and $H4(x_1)$ of the other regions 71B, 71C and 71D at the position ($x_1$) in the X axis direction of the minimum value of the region 71A are shown. These frame difference integration data are added by adders 15, 16 and 17 and supplied to a minimum value selecting circuit 6.

Frame difference integration data $H1(x_2, y_2)$, $H2(x_2, y_2)$, $H3(x_2, y_2)$, and $H4(x_2, y_2)$ are respectively supplied to input terminals 21, 22, 23, and 24. The data $H2(x_2, y_2)$ is the minimum value of the frame difference integration data of the region 71B. The data $H1(x_2, y_2)$, $H3(x_2, y_2)$ and $H4(x_2, y_2)$ are the respective frame difference integration data of the regions 71A, 71C and 71D at the same position as the position of the minimum value of the region 71B. The frame difference integration data from the input terminals 21 to 24 are added by adders 25, 26 and 27 and supplied to the minimum value selecting circuit 6.

Frame difference integration data $H1(x_3, y_3)$, $H2(x_3, y_3)$, $H3(x_3, y_3)$, and $H4(x_3, y_3)$ are respectively supplied to input terminals 31, 32, 33, and 34. The data $H3(x_3, y_3)$ is the minimum value of the frame difference integration data of the region 71C. The data $H1(x_3, y_3)$, $H2(x_3, y_3)$ and $H4(x_3, y_3)$ are the respective frame difference integration data of the regions 71A, 71B and 71D at the same position as the position of the minimum value of the region 71C. The frame difference integration data from the input terminals 31 to 34 are added by adders 35, 36 and 37 and supplied to the minimum value selecting circuit 6.

Frame difference integration data $H1(x_4, y_4)$, $H2(x_4, y_4)$, $H3(x_4, y_4)$, and $H4(x_4, y_4)$ are respectively supplied to input terminals 41, 42, 43, and 44. The data $H4(x_4, y_4)$ is the minimum value of the frame difference integration data of the region 71D. The data $H1(x_4, y_4)$, $H2(x_4, y_4)$ and $H3(x_4, y_4)$ are respectively the frame difference integration data of the regions 71A, 71B and 71C at the same position as the position of the minimum value of the region 71D. The frame difference integration data from the input terminals 41 to 44 are added by adders 45, 46 and 47 and supplied to the minimum value selecting circuit 6.

The selecting circuit 6 selects the minimum addition output among the above-mentioned four addition outputs and then the outputs it. At the same time, the selecting circuit 6 detects which addition output is minimum and generates a selection signal to control a selecting circuit 5 on the basis of the result of this detection. Namely, the movement vector in which the residual deviation becomes minimum is selected by the selecting circuit 5 from among four cases: where the movement vector of the region 71A is applied to not only the region 71A but also the other regions 71B, 71C and 71D; where the movement vector of the region 71B is applied to not only the region 71B but also the other regions 71A, 71C and 71D; where the movement vector of the region 71C is applied to not only the region 71C but also the other region 71A, 71B and 71D; and where the movement vector of the region 71D is applied to not only the region 71D but also the other regions 71A, 71B and 71C.

Due to this, the minimum value selecting circuit 6 forms a selection signal to select the movement vector of the region where the gradient of the distribution of the frame difference integration data is steep. Namely, this is because the value of the frame difference integration data of the region where the gradient toward the minimum value is steep becomes large even if the position is slightly deviated from the position of the minimum value.

In FIG. 1, adders 18, 19 and 20 serve to calculate the sum of the minimum values $H1(x_1, y_1)$ to $H4(x_4, y_4)$ of the respective frame difference integration data of the regions 71A to 71D. This sum is supplied to a subtracter 28, by which the sum is subtracted from the minimum value selected by the selecting circuit 6. An output of the subtracter 28 is supplied to a comparator 29 and is compared with a threshold value from a terminal 30.

An output signal which becomes a high level when the output of the subtracter 28 is smaller than the threshold value is outputted from the comparator 29. On the contrary, an output signal which becomes a low level when the output of the subtracter 28 is larger than the threshold value is outputted from the comparator 29. The former relation means that there is not a large difference among the distributions of the frame difference integration data of the regions 71A to 71D and accordingly the movement vector which is outputted from the selecting circuit 5 is reliable. In this case, the movement vector from the selecting circuit 5 is fetched from an output terminal 8 through an AND gate 7. At the same time, a discrimination signal which was set at a low level by an inverter 9 is outputted from an output terminal 10.

On the other hand, the latter relation such that the output of the subtracter 28 is larger than the threshold value denotes that the frame difference integration data of the regions 71A to 71D are not so completely coincident and therefore the movement vector which is outputted from the selecting circuit 5 is not reliable. In this case, it is inhibited by the AND gate 7 that the movement vector from the selecting circuit 5 is fetched. At the same time, the discrimination signal at a high level is outputted from the output terminal 10. This high level discrimination signal represents that the movement vector is not decided.

The movement vector from the selecting circuit 5 indicates the movement of the television camera. Upon band compression transmission of the high quality television signal, the movement vector is transmitted and the movement correction is performed on the reception side.

I claim:

1. An apparatus for selecting a movement vector in response to frame difference data between a present frame and a previous frame of a video signal comprising:

means for dividing each frame of said video signal into m (m is an integer) video signal area segments, means in response to present frame data and previous frame data for producing frame difference integration data for each m pairs of said m segments wherein each pair comprises one of said m segments of the previous frame and a respective one of said m segments of said present frame, means responsive to said frame difference integration data for said pairs for producing m respective movement vectors, each of said m movement vectors representing an amount and a direction of movement of an image represented by a respective one of said pairs, means for generating m residual deviation values by processing selected portions of the integration data for said pairs, means for detecting a minimum value of said m residual deviation values, and means in response to said detected minimum residual deviation value for selecting one movement vector from said m movement vectors.

2. The apparatus according to claim 1, said apparatus further comprising a control circuit for controlling output of said one selected movement vector from said apparatus.

3. The apparatus of claim 1 in which, said means for generating comprises adder circuits for adding a minimum value of the frame difference data for one of said pairs with a value of the frame difference data at a corresponding location in each of the other ones of said m pairs, for each one of said m segments, to produce said m residual deviation values.

4. The apparatus of claim 3 further comprising an adder circuit for adding the minimum values of the frame difference data, a subtraction circuit for subtracting the added minimum values from the minimum value of the m residual deviation values and producing a subtracted output, a comparator for comparing the subtracted output with a predetermined reference value, and an AND gate circuit for selectingly inhibiting the output of the selected movement vector in response to the output of said comparator.

5. The apparatus according to claim 4, in which said AND gate circuit passes said selected movement vector when a value of said subtracted signal fed to said comparator is smaller than said predetermined reference value.

6. A method of selecting a movement vector in a video system transmitting picture data consisting of a succession of video frames each formed of a plurality of pixels, comprising the steps of:

dividing each of said video frames into m video frame segments;

deriving a movement vector for each of m pairs of said m video frame segments wherein each of said pairs comprises one of said m segments of a current one of the frames and a respective one of said m segments of a previous one of said frames;

deriving a plurality of frame difference values for each of said pairs by comparing a pixel at the spatial center of the segment of said previous frame with each pixel in the respective segment in said current frame;

selecting a minimum value from among said plurality of frame difference values for each of said pairs; and selecting one of the m movement vectors based upon the selected minimum values.

7. The method of claim 6 in which said step of dividing each video frame into m segments includes selecting m equal to four.

8. The method of claim 6 in which said step of selecting a minimum value of said plurality of frame difference values for each of said pairs includes selecting a minimum value of frame difference data for each of said m pairs and adding said selected minimum value for one of said pairs with a value of the frame difference data at a corresponding location in each of the other ones of said m pairs, and performing said step of adding for each one of said m pairs to produce m residual deviation values.

9. The method of claim 8 further comprising adding said selected minimum values of frame difference data, subtracting said added minimum values from the minimum value of the m residual deviation values, comparing the subtracted output with a predetermined reference value, and selectively inhibiting output of said selected movement vector in response to a result of said comparison.

* * * * *

UNITED STATES PATENT AND TRADEMARK OFFICE
CERTIFICATE OF CORRECTION

PATENT NO. : 4,777,530
DATED : October 11, 1988
INVENTOR(S) : Tetsujiro Kondo

It is certified that error appears in the above-identified patent and that said Letters Patent is hereby corrected as shown below:

Column 1, line 30, after "accuracy" insert --,--.

Column 2, line 16, change "noises" to --noise--;
         line 63, delete "are".

Column 3, line 5, after "Fig. 5" insert --,--;
         line 65, change "eachof" to -- each of--.

IN CLAIMS

Column 7, line 27, after "which" delete --,--.

Signed and Sealed this

Twenty-eighth Day of March, 1989

Attest:

DONALD J. QUIGG

*Attesting Officer*  *Commissioner of Patents and Trademarks*